April 23, 1957 — J. E. HOLT — 2,789,311
MANUFACTURE OF SPEEDOMETER GEAR UNITS
Filed Feb. 19, 1953 — 3 Sheets-Sheet 2
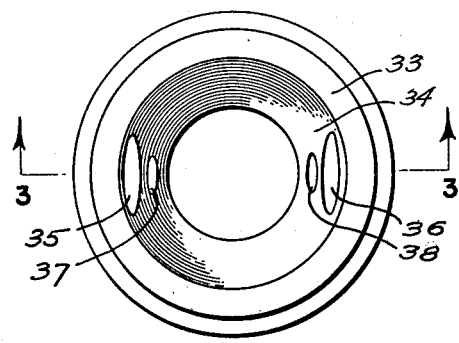
FIG. 2
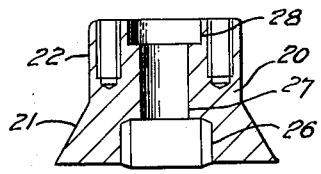
FIG. 4
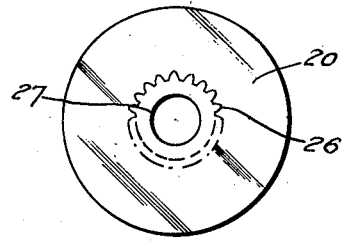
FIG. 5
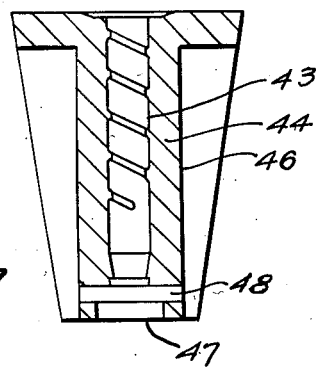
FIG. 3
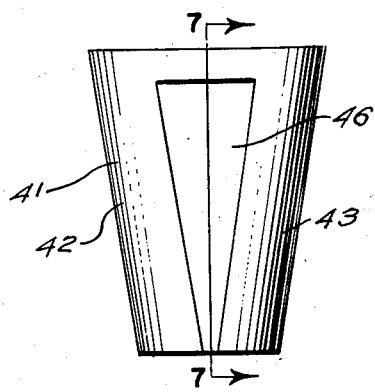
FIG. 6
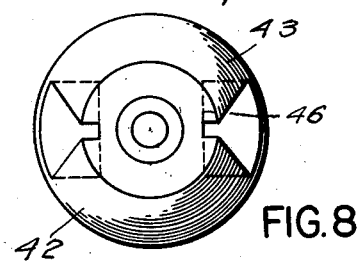
FIG. 7
FIG. 8
INVENTOR.
John E. Holt
BY Nathaniel Frucht
atty April 23, 1957   J. E. HOLT   2,789,311
MANUFACTURE OF SPEEDOMETER GEAR UNITS
Filed Feb. 19, 1953   3 Sheets-Sheet 3

INVENTOR.
John E. Holt
BY Nathaniel Frucht
atty

United States Patent Office 2,789,311
Patented Apr. 23, 1957

2,789,311

MANUFACTURE OF SPEEDOMETER GEAR UNITS

John E. Holt, Danielson, Conn., assignor to The Danielson Manufacturing Company, a corporation of Rhode Island Application February 19, 1953, Serial No. 337,864

8 Claims. (Cl. 18—2)

The present invention relates to the manufacture of speedometer gear units and has particular reference to a novel manufacture for a plastic helical gear having an integral grooved shaft.

Speedometer gear units as at present manufactured utilize a hardened steel shaft with a helical oil groove, a phenolic and fibre machine cut gear blank being forced onto a knurled end of the steel shaft. This procedure is costly and the gear wears out in due course and requires replacement. Substitution of a nylon gear for the phenolic and fibre gear has increased the effective life, without, however, reducing the cost.

The principal object of the present invention is to provide a one piece molded plastic speedometer gear unit having a helical gear and an integral grooved shaft.

Another object of the invention is to lower the cost of production by forming a hollow gear and shaft to reduce the material required, and positioning a solid membrane in the hollow shaft to stop oil flow.

With the above and other objects and advantageous features in view, the invention comprises a novel method of manufacture, a novel molding apparatus, and a novel gear unit more fully disclosed in the detailed description following, in conjunction with the accompanying drawings, and more specifically defined in the claims appended thereto.

In the drawings,

Fig. 2 is a top plan view of the cavity shell;

Fig. 3 is a section on the line 3—3 of Fig. 2;

Fig. 4 is a central vertical section through the rotatable gear portion;

Fig. 5 is a bottom plan view of Fig. 4, parts being omitted;

Fig. 6 is a side view of the split shaft portion;

Fig. 7 is a vertical section through the split shaft portion;

Fig. 8 is a bottom plan view of Fig. 6, the view being turned 90 degrees;

Figure 1:
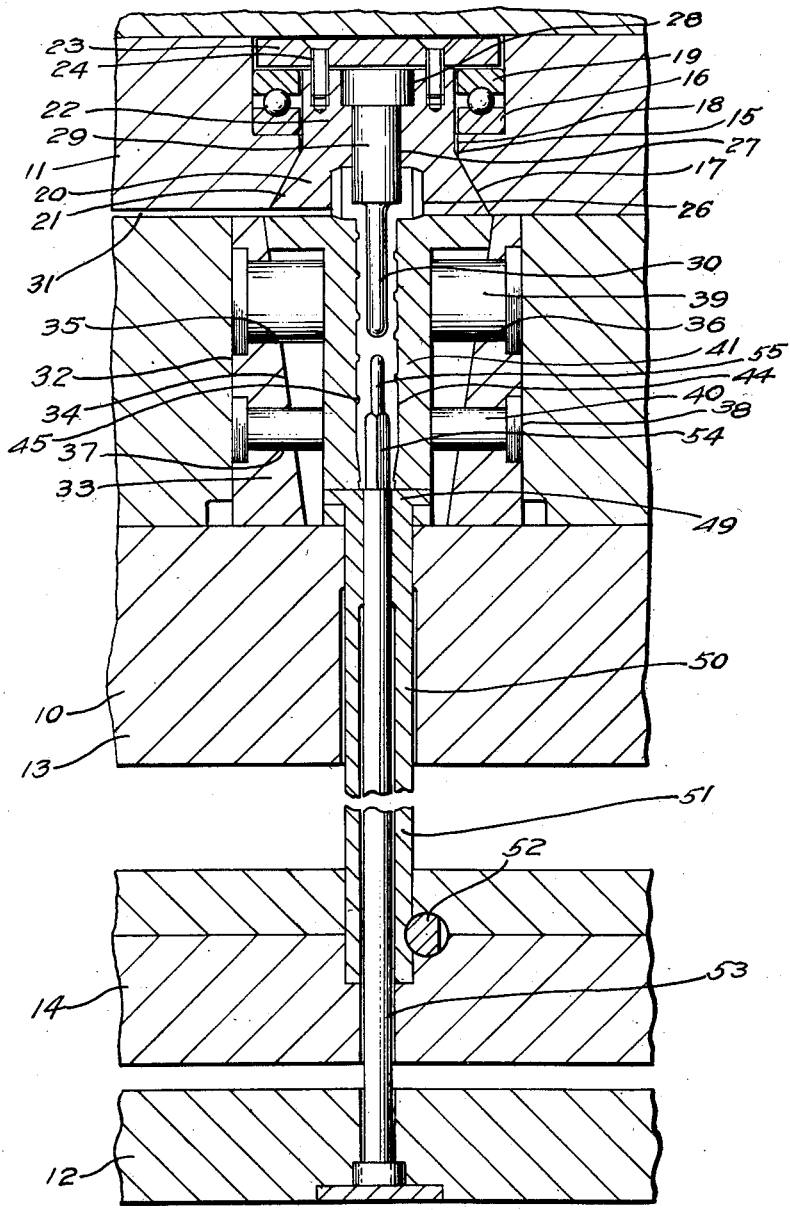
Fig. 1 is a detail vertical sectional view through one cavity of a multi-cavity mold of standard type which includes a rotatable gear portion and a split shaft portion.

It has been found desirable to mold an integral speedometer gear and shaft unit of plastic material, and particularly nylon and similar plastics having the long wearing and slightly elastic characteristics of nylon. Since the desired speedometer gear is helical, and the shaft has a helical oil groove, I have devised a special mold having a rotatable gear portion and a split shaft portion, the parts being arranged to position the rotatable gear portion in a fixed upper mold section, and the split shaft portion in a moving lower mold section having a knockout plate. As the mold breaks and the moving lower mold section draws away, the rotatable gear portion turns to permit withdrawal of the helical gear; in the last part of the lower mold section movement the knockout plate is forced upwardly by the usual knock-out bars, to force an ejector sleeve upwardly and open the lower split mold portion.

Referring to the drawings, the mold 10 includes an upper fixed mold section 11, and a mold base 12 on which a lower movable mold section 13 and a movable knockout plate 14 are mounted in standard manner. The upper fixed mold section 11 has a recess 15 including an upper cylindrical bore 16, a lower conical bore 17, and an intermediate annular portion 18; an annular ball bearing 19 is seated in the bore 16, and a mold head 20 having a lower conical portion 21 and an upper cylindrical portion 22 is seated in the recess 15 and is attached to a support disk 23 by countersunk screws 24, the disk riding on the annular ball bearing 19 and being spaced from the ball bearing and the upper wall of the recess 15 to permit a slight upward movement of the gear mold to seat firmly in the lower conical recess bore 17 and to permit a slight downward movement of the gear mold to free the mold head and permit rotation by engagement of the disk 23 with the upper portion of the annular ball bearing 19.

The mold head is recessed to provide a gear cavity 26 having annularly disposed helical teeth, and has a center bore 27 and an enlarged upper bore 28 to accommodate a central stepped pin 29 for providing a hollow in the helical gear, the pin 29 having a depending extension 30 which is rounded at its lower end as illustrated. The upper fixed mold section 11 is preferably channeled as indicated at 31 for inflow of plastic material to the mold cavities.

The lower mold section 13 has an upper recess 32 in which a sleeve 33 is mounted, the sleeve having a conical downwardly converging bore 34, see Fig. 3, and spaced upper openings 35, 36 and lower openings 37, 38 for mounting upper and lower sets of spacer pins 39, 40. A split mold 41, see Figs. 6 to 8, includes two portions 42, 43 having outer half conical surfaces to seat in the conical sleeve bore 34 and facing linear surfaces which have half cavities joining to provide a shaft cavity 44, the cavity having helical projections 45. The two split mold portions 42, 43 are recessed to provide flat surfaces 46 having converging sides, for receiving the inner ends of the spacer pins 39, 40 as illustrated in Fig. 1.

The split mold portions 42, 43 are also recessed at their lower ends to provide a central opening 47 and an enlarged annular space 48 for receiving the enlarged head 49 and the tubular body 50 of an ejector sleeve 51 which is set into the knock-out plate 14, see Fig. 1, and is keyed thereto by a cross-key 52. A center pin rod 53 is mounted in the mold base 12 and extends through the ejector sleeve 51 and is provided with a square pin portion 54 positioned in the shaft cavity 35, the square portion 54 having an upstanding terminal 55 which is rounded at its upper end and is spaced slightly below the depending extension 30 of the mold head pin 29, which extends in axial alignment therewith into the shaft cavity 44.

When the mold parts are in molding position, the heated fluid plastic is admitted through the channel 31 to fill the head and the split mold cavities. The mold being cooled in the usual manner, the lower mold section breaks away, and the head mold follows slightly and then freely turns to permit withdrawal of the helical gear therefrom, the square pin portion 54 constituting a lock part which holds the helical gear against rotation. The mold section 13 continues to move downwardly, and the knock-off plate 14 rises to shift the ejector sleeve upwardly around the stationary pin rod 53, whereupon the split mold portions 42, 43 separate and the molded gear unit is accessible for lifting off the square pin portion 54 of the center pin rod. Upward movement of the mold section 13 draws the split mold portions together for a subsequent molding operation.

Figures 9, 10:
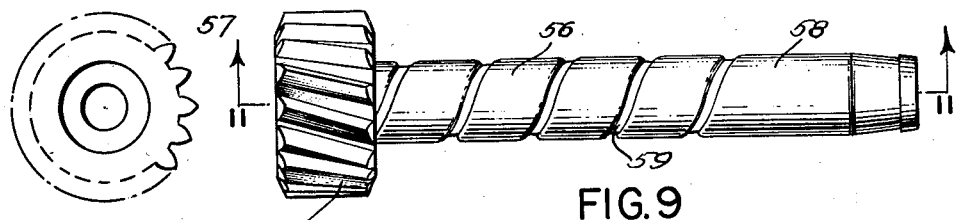
Fig. 9 is a side view of a speedometer gear unit of the type used in an Oldsmobile automobile.
Fig. 10 is an end view of Fig. 9.
Figure 11:
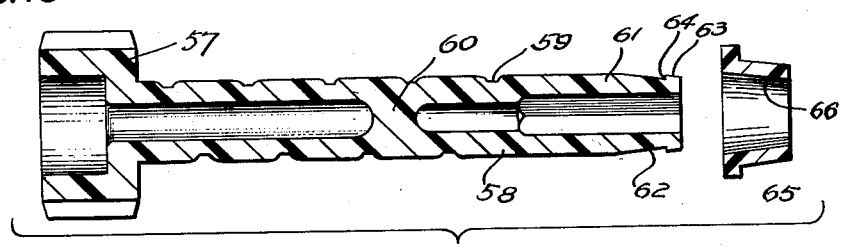
Fig. 11 is an exploded sectional view of the unit of Fig. 9 and its end guide ring.
Figure 12:
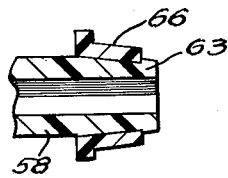
Fig. 12 is a detail section showing the guide ring snapped in place.

The resulting gear unit 56 is illustrated in Fig. 9, and includes a helical gear 57 which is hollowed out, a hollow shaft 58 which is helically grooved as indicated at 59 to provide an oil groove, and a solid membrane or barrier 60 within the hollow shaft to prevent flow of oil therethrough. The distal end 61 of the shaft is preferably tapered as indicated at 62 with a stepped tapered ridge 63, these features being obtained by shaping the shaft mold cavity in accordance, whereby an annular snap groove 64 is provided. A snap ring element 65 having a tapered bore 66 is of a size to snap fit over the ridge 63 with its lower edge locked in the snap groove 64, see Fig. 12, to provide a bearing for the lower edge of the shaft. This type of gear unit is specifically designed for Oldsmobile type automobiles.

Figure 13:
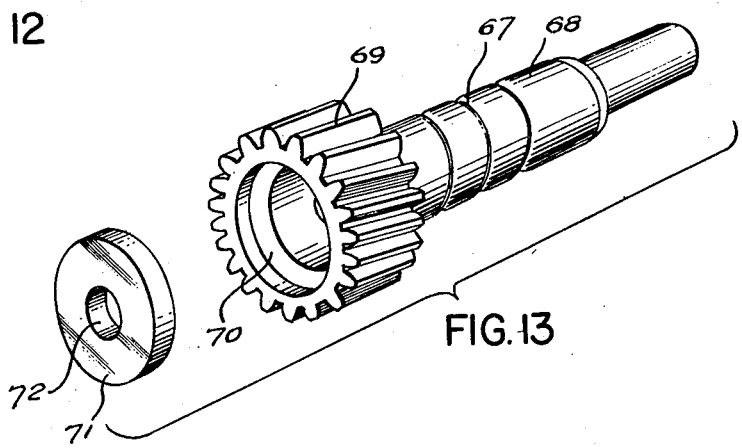
Fig. 13 is an exploded perspective view of a gear unit of the Stewart-Warner type and its upper guide bearing washer.

A similar manufacturing procedure is utilized for molding gear units of the type used for Stewart-Warner systems, the unit 67 in such case being of the free-floating type, as illustrated in Fig. 13, and having a grooved stepped shaft 68, and a helical gear 69 which is annularly recessed as indicated at 70. A bearing disk 71 having a central opening 72 is adapted to seat in the annular gear recess 70.

The preferred plastic is nylon, as this material has very long life, and is slightly resilient to thereby snap receive bearing rings and the like.

Although I have disclosed a specific molding operation and a specific mold apparatus for producing specific integral gear units, it is obvious that changes in the size, arrangement and disposition of the parts may be made to meet the requirements for molding different types of helical gear units, including herringbone gears, without departing from the spirit or the scope of the invention as defined in the appended claims.

I claim:

1. The method of molding an integral gear unit having two portions each with helical elements, comprising the steps of molding one portion in a split mold while simultaneously molding the other portion in a communicating rotatable mold, and ejecting the gear unit from the mold portions by moving the molded article axially with the split mold while holding it against rotation and simultaneously rotating the rotatable mold to release the rotatable mold portion, and then ejecting the other portion from the split mold.

2. The method of molding an integral gear unit having a helical gear portion and a helically grooved shaft portion, comprising the steps of molding the shaft portion in a split mold while simultaneously molding the gear portion in a communicating rotatable mold, and ejecting the gear unit from the mold portions by moving the molded article axially with the split mold while holding it against rotation and simultaneously rotating the rotatable mold to release the gear portion, and then ejecting the shaft portion from the split mold.

3. In a molding machine for molding integral gear units having a helical gear and a helically grooved shaft extending therefrom, an upper fixed portion having a recess, a mold section rotatably mounted in said recess and having a mold cavity for forming the helical gear, a lower movable portion having a recess, a split mold in said recess having a mold cavity in axial alignment with the rotatable mold section for forming the helical shaft, means for moving the lower portion away from the upper portion thereby causing the latter to rotate as the helical gear is pulled therefrom, means in said lower portion for holding said shaft therein against rotation, and means for opening the split mold to release the molded gear unit.

4. In a molding machine for molding integral gear units having a helical gear and a helically grooved shaft extending therefrom, an upper fixed portion having a recess, a mold section rotatably mounted in said recess and having a mold cavity for forming the helical gear, a lower movable portion having a recess, a split mold in said recess having a mold cavity in axial alignment with the rotatable mold section for forming the helical shaft, means for moving the lower portion away from the upper portion thereby causing the latter to rotate as the helical gear is pulled therefrom, a movable ejector sleeve in said lower portion movable to open the split mold, and a fixed center pin in said ejector sleeve having an article lock part positioned in the split mold cavity.

5. In a molding machine for molding integral gear units having a helical gear and a helically grooved shaft extending therefrom, an upper fixed portion having a recess, a mold section rotatably mounted in said recess and having a mold cavity for forming the helical gear, a lower movable portion having a recess, a split mold in said recess having a mold cavity in axial alignment with the rotatable mold section for forming the helical shaft, means for moving the lower portion away from the upper portion thereby causing the latter to rotate as the helical gear is pulled therefrom, a movable ejector sleeve in said lower portion movable to open the split mold, and a fixed center pin in said ejector sleeve having an article lock part positioned in the split mold cavity in spaced aligned relation to the fixed center pin lock part.

6. In a molding machine for molding integral gear units having a helical gear and a helically grooved shaft extending therefrom, an upper fixed portion having a recess, a mold section rotatably mounted in said recess and having a mold cavity for forming the helical gear, a lower movable portion having a recess, a mold sleeve in said lower portion cavity having a conical bore, a split mold having two half conical portions in said bore having a mold cavity in axial alignment with the rotatable mold section, said sleeve having spreader pins and said split mold portions having cooperating converging grooves, means for moving the lower portion away from the upper portion thereby causing the latter to rotate as the helical gear is pulled therefrom, a movable ejector sleeve in said lower portion movable to open the split mold, and a fixed center pin in said ejector sleeve having an article lock part positioned in the split mold cavity.

7. In a molding machine for molding integral gear units having a helical gear and a helically grooved shaft extending therefrom, an upper fixed portion having a recess, a mold section rotatably mounted in said recess and having a mold cavity for forming the helical gear, a lower movable portion having a recess, a mold sleeve in said lower portion cavity having a conical bore, a split mold having two half conical portions in said bore having a mold cavity in axial alignment with the rotatable mold section, said sleeve having spreader pins and said split mold portions having cooperating converging grooves, means for moving the lower portion away from the upper portion thereby causing the latter to rotate as the helical gear is pulled therefrom, a movable ejector sleeve in said lower portion movable to open the split mold, and a fixed center pin in said ejector sleeve having an article lock part positioned in the split mold cavity, said rotatable mold section having a depending portion extending into the split mold cavity.

8. In a molding machine for molding integral gear units having a helical gear and a helically grooved shaft extending therefrom, an upper fixed portion having a recess, a mold section rotatably mounted in said recess and having a mold cavity for forming the helical gear, a lower movable portion having a recess, a mold sleeve in said lower portion cavity having a conical bore, a split mold having two half conical portions in said bore having a mold cavity in axial alignment with the rotatable mold section, said sleeve having spreader pins and said split mold portions having cooperating converging grooves, means for moving the lower portion away from the upper portion thereby causing the latter to rotate as the helical gear is pulled therefrom, a movable ejector sleeve in said lower portion movable to open the split mold, and a fixed center pin in said ejector sleeve having an article lock part positioned in the split mold cavity, said rotatable mold section having a depending portion extending into the split mold cavity in spaced aligned relation to the fixed center pin lock part.

References Cited in the file of this patent

UNITED STATES PATENTS

| | | |
|---|---|---|
| 2,018,480 | Apple | Oct. 22, 1935 |
| 2,092,410 | Wheeler | Sept. 7, 1937 |
| 2,317,275 | Kinzie | Apr. 20, 1943 |
| 2,366,475 | Bartholomew | Jan. 2, 1945 |
| 2,558,027 | Welson | June 26, 1951 |